United States Patent
Mason

[11] Patent Number: 5,890,510
[45] Date of Patent: Apr. 6, 1999

[54] CONDENSATE RETURN RETROFIT KIT

[75] Inventor: Lloyd R. Mason, Lincoln, Ill.

[73] Assignee: Condensate Return Specialists, Inc., Lincoln, Ill.

[21] Appl. No.: 112,479

[22] Filed: Jul. 9, 1998

[51] Int. Cl.$^6$ ....................................................... F16T 1/34
[52] U.S. Cl. .................. 137/177; 55/466; 138/41
[58] Field of Search .............................. 55/466; 137/177; 138/41

[56] References Cited

U.S. PATENT DOCUMENTS 5,676,719  10/1997  Stavropoulos et al. .................... 55/466

Primary Examiner—Gerald A. Michalsky
Attorney, Agent, or Firm—Philip L. Bateman

[57] ABSTRACT

A retrofit kit replaces the thermostatic element in a radiator steam trap having a hollow body with a horizontal side steam inlet, a vertical bottom condensate outlet, and a top cover. The retrofit kit contains an insert with a restricted passageway that rests in and over the condensate outlet, a cylindrical spring for blocking the flow of particles into the restricted passageway of the insert, and a compression coil spring for holding the insert and screen in position. The restricted passageway in the insert contains a plurality of horizontal radial inlets in the upper portion of the insert that communicate with a vertical conduit extending downward through the insert, the vertical conduit having an opening at the bottom, but not at the top, of the insert.

14 Claims, 1 Drawing Sheet

CONDENSATE RETURN RETROFIT KIT

FIELD OF THE INVENTION

This invention relates to the removal of condensate from steam lines. More particularly, this invention relates to continuous flow condensate return retrofit kits for radiator steam traps.

BACKGROUND OF THE INVENTION

Steam systems are used for heating in a wide variety of industrial, commercial, and residential applications. As heat is transferred from the steam to the surroundings, condensation occurs and liquid condensate is formed within the steam line. The presence of condensate in a steam line reduces the heat transfer efficiency and also causes mechanical and corrosive damage. Accordingly, all steam systems include some mechanism for removing condensate.

Condensate removal systems typically contain a number of devices placed at low points in the system that allow condensate to leave the steam line and pass through condensate lines that run to a condensate receiver. There are two basic types of condensate removal devices. Devices of the first type permit the periodic flow of condensate and are commonly known as steam traps. The periodic flow devices usually contain a thermostatically-controlled valve that detects the accumulation of cooled condensate and opens to allow the condensate to flow out of the steam line. A common example of such a device is the steam trap located near the bottom of steam radiators used for space heating. The primary disadvantage of periodic flow devices is that they have moving parts that eventually fail and must be replaced.

Condensate removal devices of the second type feature a restricted passageway through which condensate continually flows. Continuous flow devices have no moving parts to fail. However, the sizing of the passageway is critically important. If the passageway is too small, condensate builds up in the steam line. If the passageway is too large, excessive amounts of steam escape with the condensate. Optimal sizing of a passageway for a given application is very difficult to predict. Even with accurate and abundant information concerning the particular application, it is often necessary for the sizing of the passageway to be changed from the original prediction.

LeBlanc, U.S. Pat. No. 5,120,336, issued Jun. 9, 1992, incorporated herein by reference, discloses a retrofit kit for radiator steam traps. The retrofit kit contains a nozzle body, filter screen, and spring that replace the thermostatic element, valve, and valve seat in a standard steam trap. The nozzle body fits into the condensate outlet of the steam trap and contains a coaxial venturi passage. The top of the nozzle body is positioned below the steam inlet of the steam trap so that condensate enters the venturi passage tangentially and so that airlock at the entrance of the venturi passage is avoided. Because radiators and radiator steam traps are of many different sizes and capacities, the LeBlanc retrofit kit is sold with over one hundred different nozzle body sizes. The LeBlanc retrofit kit is also sold with many different sizes of screens and springs.

Accordingly, a demand exists for an improved continuous flow retrofit kit for radiator steam traps. In particular, a demand exists for such a retrofit kit that requires only a small number of different parts to fit the many different radiators and radiator steam traps that are in use.

SUMMARY OF THE INVENTION

The general objects of this invention are to provide an improved retrofit kit for radiator steam traps and an improved radiator steam trap. A more particular object is to provide such a retrofit kit that requires only a small number of different parts to fit the many different radiators and radiator steam traps that are in use.

I have invented a retrofit kit for replacing the thermostatic element in a radiator steam trap having a hollow body with a horizontal side steam inlet, a vertical bottom condensate outlet, and a top cover. The retrofit kit comprises: (a) an insert adapted to rest in and over the condensate outlet and having: (i) a lower cylindrical portion whose diameter is slightly less than the diameter of the condensate outlet so that the lower cylindrical portion fits snugly within the condensate outlet; (ii) a flange above the lower cylindrical portion whose diameter is greater than the diameter of the condensate outlet so that the insert is retained at the condensate outlet; (iii) an upper portion whose top is located at or above the steam inlet when the insert rests in and over the condensate outlet; and (iv) a restricted passageway for the flow of condensate from the steam inlet to the condensate outlet, the passageway comprising a plurality of horizontal radial inlets in the upper portion of the insert that communicate with a vertical conduit extending downward through the insert, the vertical conduit having an opening at the bottom, but not at the top, of the insert; (b) a cylindrical screen for blocking the flow of particles into the restricted passageway of the insert, the screen having a diameter slightly greater than the diameter of the upper portion of the insert and having a height about equal to or slightly greater than the distance between the condensate outlet and the top cover so that substantially all the fluid entering the restricted passageway of the insert first passes through the screen; and (c) a compression coil spring having a diameter slightly greater than the diameter of the cylindrical screen and having a height slightly greater than the distance between the condensate outlet and the top cover so that, when the spring is placed into the trap and over the insert and screen, the spring is compressed and holds the insert and screen in position.

The retrofit kit of this invention greatly reduces the number of parts required to fit the many different radiators and radiator steam traps that are in use. The upper portion of the insert anchors the spring and screen which, in turn, enables springs and screens of the same diameter to be universally used. When the upper portion and the lower portion of the insert are made of two separate parts, the passageway in the upper portion is universally sized.

DETAILED DESCRIPTION OF THE INVENTION

Figure 1:
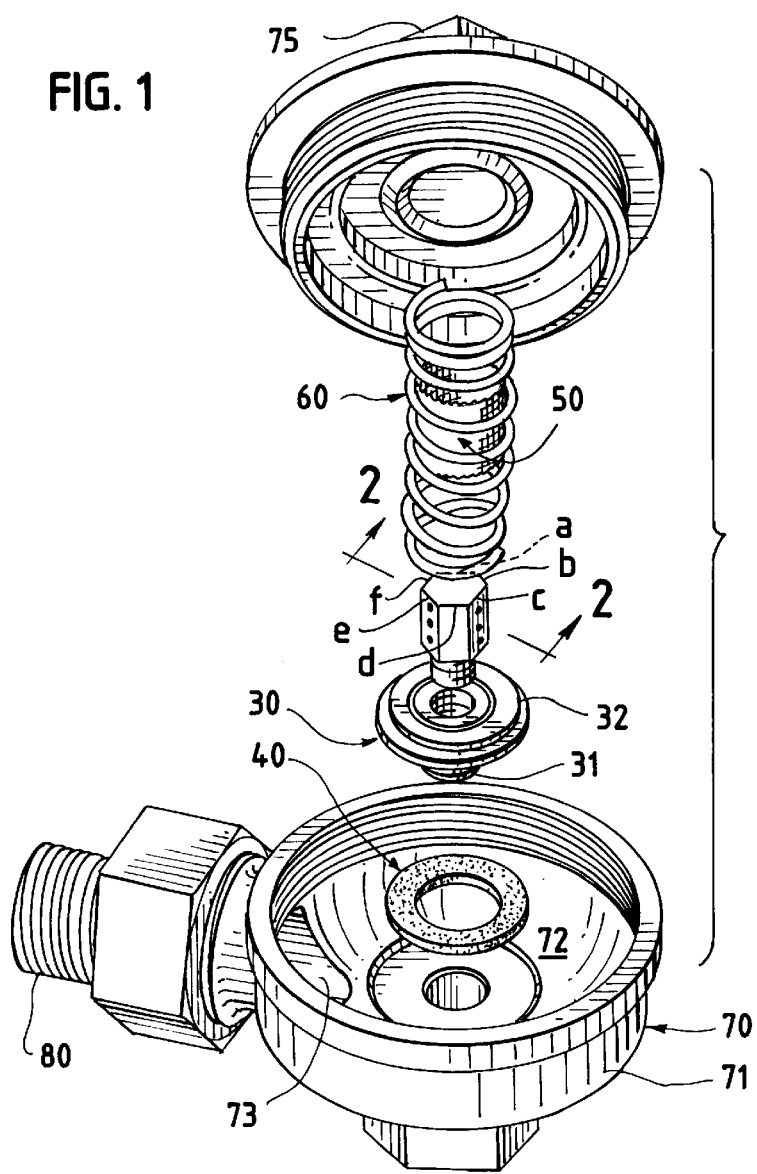
FIG. 1 is an exploded perspective view of the preferred embodiment of the condensate return retrofit kit of this invention.

This invention is best understood by reference to the drawings. The preferred embodiment of the retrofit kit 10 of this invention includes a post 20, a sleeve 30, a gasket 40, a screen 50, and a spring 60. When combined together, the post and the sleeve are referred to as the insert. Each component of the retrofit kit is discussed in detail below. The retrofit kit is used inside a radiator steam trap 70. The term "radiator steam trap" is used herein to refer to steam traps having a horizontal side steam inlet and a vertical bottom condensate outlet, regardless of the type of steam heat exchanger. The steam trap has a hollow body 71 that defines an interior space 72, a horizontal side steam inlet 73, a vertical bottom condensate outlet 74, and a top cover 75 that threads onto the body. A steam line 80 coming from a radiator and a condensate line 90 going to a condensate receiver are attached to the steam trap. The steam line is at superatmospheric pressure, i.e., a pressure greater than atmospheric, and contains condensate which flows to the steam trap. The condensate line is at a lower pressure than the steam line and is typically at atmospheric pressure or subatmospheric pressure.

Figure 5:
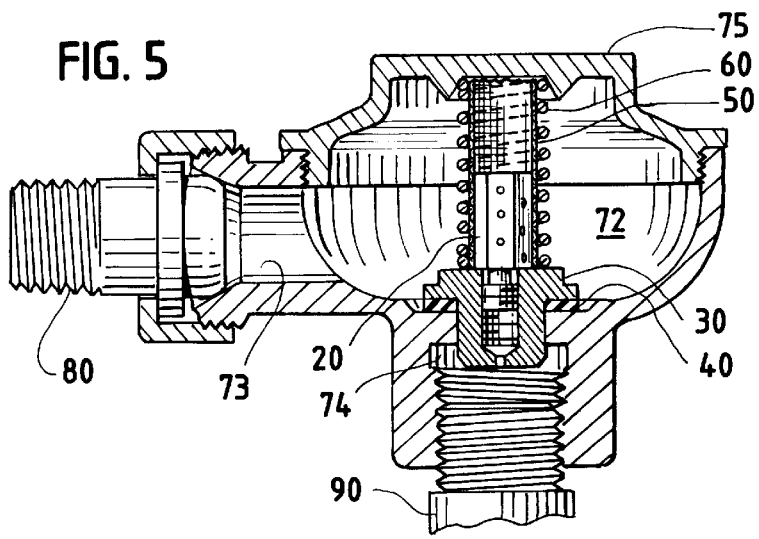
FIG. 5 is a side elevation view, partially in section, of the retrofit kit in place in a radiator steam trap.

The insert rests in and over the condensate outlet in the steam trap. The top of the insert is located at or above the steam inlet. As seen in FIG. 5, the preferred embodiment features an insert whose top is located between the center axis of the steam inlet and the top of the steam inlet. The insert contains a restricted passageway through which condensate from the steam line flows to enter the condensate line. Ideally, the restricted passageway is sized to allow all the condensate entering the steam trap to exit, but to not allow any steam to exit. This ideal flow pattern is difficult to achieve in practice because the rate of heat transfer (and the resulting rate of condensate formation) inevitably varies. In the preferred embodiment shown, the insert consists of a post and a sleeve, each of which has a restricted passageway. The post has a hexagonal horizontal cross-section with sides a, b, c, d, e, and f. The post also has a threaded member 21 extending downward for attachment to the sleeve. The post has a height of about 1.5 cm, exclusive of the threaded member. The post is preferably made of brass, stainless steel, or other similar material that can withstand the environment inside a steam trap.

Figure 2:
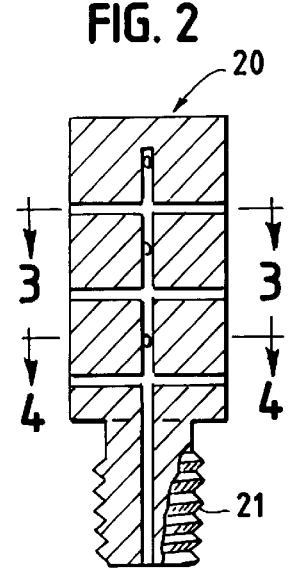
FIG. 2 is a sectional view of one component of the retrofit kit taken along section 2—2 of FIG.1.
Figure 3:
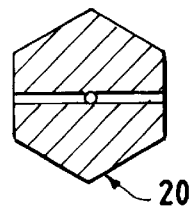
FIG. 3 is a sectional view thereof taken along section 3—3 of FIG. 2
Figure 4:
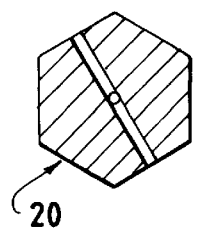
FIG. 4 is a sectional view thereof taken along section 4—4 of FIG. 2

The post contains a restricted passageway consisting of about one to six sets of horizontal conduits having a diameter of about 1 to 3 mm and one vertical conduit. In the preferred embodiment of the post shown in detail in FIGS. 2–4, the post contains two sets of three horizontal conduits. A first set of three vertically-aligned horizontal conduits having a diameter of about 2 mm pass through the post with openings in opposing sides b and e. A second set of similar conduits pass through the post with openings in opposing sides c and f. The hexagonal shape of the post has flat faces on the surface which simplifies the drilling of the horizontal conduits. A vertical conduit having a diameter of about 3 mm extends upward through the post to a point below the top of the post, but at or above the point where the uppermost horizontal conduit passes. The vertical conduit thus communicates with, i.e., intersects, all the horizontal conduits. It can be seen that condensate enters the restricted passageway of the preferred post through all twelve of the openings (three each in sides b, c, e, and f) and then exits through the bottom opening of the vertical conduit.

As discussed in detail below, the restricted passageway in the post has a cross-sectional area greater than that of the sleeve. This ensures that the sizing of the passageway in the sleeve, rather than in the post, provides the limit on condensate flow through the insert. Accordingly, the exact dimensions of the passageway in the post are not critical and a single-sized post can be used with all or most radiator steam traps.

The second part of the insert is the sleeve. The sleeve of the preferred embodiment is made of stainless steel. Stainless steel resists corrosion and is compatible with the material of the post. The sleeve contains a lower cylindrical portion 31 whose outside diameter is slightly less than the diameter of the condensate outlet so that the lower cylindrical portion fits snugly within the condensate outlet. A snug fit provides a better seal. The length of the lower cylindrical portion is about 1 cm.

The sleeve contains a flange 32 whose diameter is greater than the diameter of the condensate outlet so that the sleeve is retained on the condensate outlet. The diameter of the flange in the preferred embodiment is about 2 cm. The gasket is placed between the flange and the body of the steam trap to provide a seal. As previously mentioned, the sleeve contains a restricted passageway. The first part of the passageway is an internal threaded conduit which mates with the threaded member of the post. Communicating with, and directly below, the threaded conduit is a vertical conduit. The vertical conduit in the sleeve limits the flow of condensate through the insert (and through the steam trap). In other words, the cross-sectional area of the vertical conduit in the sleeve is less than the cross-sectional area of the passageway in the post. The diameter of the vertical conduit varies from about 0.3 to 3 mm depending on the desired rate of condensate flow which, in turn, depends on the rate of condensate formation in the steam line leading to the steam trap.

The post and the sleeve can be combined into a single piece. However, it is preferable that the post and sleeve be separate pieces because this simplifies manufacturing and it reduces the size of the component containing the different sizes of passageways that are required to fit different steam traps. It can be appreciated that installers of condensate return systems must maintain an inventory of parts to fit the many different types of radiator steam traps in use. Reducing the number, size, and cost of parts that must be inventoried is desirable.

The screen is cylindrical in shape and has openings that are smaller than the diameter of the restricted passageway in the insert so that particles that might plug the restricted passageway are prevented from passing through the screen. The screen has a diameter slightly greater than the diameter of the post and has a height about equal to or slightly greater than the distance between the condensate outlet and the top cover so that substantially all the fluid entering the restricted passageway of the insert first passes through the screen.

The spring is of the compression coil type. It has a diameter slightly greater than the diameter of the cylindrical screen and has a height slightly greater than the distance between the condensate outlet and the top cover. When the spring is placed into the trap and over the insert and screen, the spring is compressed and holds the insert and screen in position.

As previously stated, the vertical conduit in the sleeve limits the flow of condensate through the insert (and through the steam trap). The rate of flow of condensate is important because, if the flow is too small, condensate builds up in the steam line, and, if the flow is too great, steam escapes. Accordingly, the sizing of the vertical conduit in the sleeve is of critical importance. The sizing is initially determined using the following two-step procedure.

The first step of the procedure is to estimate the rate of condensate formation to be serviced by the steam trap. The rate of condensate formation depends on numerous factors. For example, in the case of a radiator used for space heating, the factors include the temperature and pressure of the steam, the size and temperature of the room being heated, the size and efficiency of the radiator, the air flow rate past the radiator, etc.

The second step of the procedure is to calculate the diameter of the vertical conduit necessary to produce a flow rate at least equal to the estimated condensate formation rate. The diameter of the vertical conduit can be determined from the formula:

$$d = K\, Q^{0.5} P^{-0.25}$$

where d=the diameter of the vertical conduit in millimeters (mm),

K=a combination of quantities including the density of water and the conversion factors between Q and P such that d has units of millimeters.

The numerical value of K for this invention is 0.248,

Q=the flow rate of condensate through the vertical conduit in pounds per hour, and P=the difference in pressure between the steam line and the condensate line in pounds per square inch (psi).

For example, if Q=10 pounds of condensate per hour and P=5 psi, then the calculated diameter is 0.525 mm. The theory from which the above formula is derived appears in many engineering textbooks and publications, including *The Piping Handbook* (5th Ed. by Reno C. King and Sabin Crocker. McGraw-Hill 1967. Chapter 3) and *Fluid Mechanics* (2nd Ed. by William F. Hughes and John A. Brighton. McGraw-Hill 1991. Appendix G).

To minimize inventory, each vertical conduit is individually drilled as needed based on the above calculations. Alternatively, an inventory of pre-drilled sleeves can be maintained. When such an inventory is maintained and a radiator steam trap is to be fitted, the rate of condensate formation is estimated, the diameter is calculated using the above formula, and then the pre-drilled sleeve whose conduit diameter is just larger than the calculated diameter is chosen. The number of diameters of pre-drilled sleeves to maintain in inventory is a matter of choice. As the number of diameters of pre-drilled sleeves increases, the difference between the actual diameter and the calculated diameter tends to decrease, but the cost of maintaining an inventory increases.

The initial determination of the sizing of the vertical conduit is, of course, based on an estimated rate of condensation formation. As a practical matter, estimating the rate of condensation formation is as much an art as a science due to the many factors affecting the rate that are incapable of being easily and precisely measured. Accordingly, it is common practice in the industry to check the sizing of the vertical conduit after installation. If condensate is building up in the steam trap, a sleeve with a larger vertical conduit is installed. Conversely, if excessive amounts of steam are passing through the steam trap, a sleeve with a smaller vertical conduit is installed.

I claim:

1. A retrofit kit for replacing the thermostatic element in a radiator steam trap having a hollow body with a horizontal side steam inlet, a vertical bottom condensate outlet, and a top cover, the retrofit kit comprising:
   (a) an insert adapted to rest in and over the condensate outlet and having:
      (i) a lower cylindrical portion whose diameter is slightly less than the diameter of the condensate outlet so that the lower cylindrical portion fits snugly within the condensate outlet;
      (ii) a flange above the lower cylindrical portion whose diameter is it greater than the diameter of the condensate outlet so that the insert is retained at the condensate outlet;
      (iii) an upper portion whose top is located at or above the steam inlet when the insert rests in and over the condensate outlet; and
      (iv) a restricted passageway for the flow of condensate from the steam inlet to the condensate outlet, the passageway comprising a plurality of horizontal radial inlets in the upper portion of the insert that communicate with a vertical conduit extending downward through the insert, the vertical conduit having an opening at the bottom, but not at the top, of the insert;
   (b) a cylindrical screen for blocking the flow of particles into the restricted passageway of the insert, the screen having a diameter slightly greater than the diameter of the upper portion of the insert and having a height about equal to or slightly greater than the distance between the condensate outlet and the top cover so that substantially all the fluid entering the restricted passageway of the insert first passes through the screen; and
   (c) a compression coil spring having a diameter slightly greater than the diameter of the cylindrical screen and having a height slightly greater than the distance between the condensate outlet and the top cover so that, when the spring is placed into the trap and over the insert and screen, the spring is compressed and holds the insert and screen in position.

2. The retrofit kit of claim 1 wherein the insert consists of a post and a sleeve, the post comprising the upper portion of the insert and the sleeve comprising the lower cylindrical portion and the projection of the insert.

3. The retrofit kit of claim 2 wherein the restricted passageway in the post has a cross-sectional area greater than that of the sleeve.

4. The retrofit kit of claim 3 wherein the post has a hexagonal horizontal cross-section.

5. The retrofit kit of claim 4 wherein the horizontal side steam inlet has a center axis and a top and wherein the top of the post is located between the center axis and the top of the steam inlet.

6. The retrofit kit of claim 5 wherein the restricted passageway in the sleeve has a diameter of about 0.3 to 3 mm.

7. The retrofit kit of claim 6 additionally comprising a gasket adapted to fit between the flange and the body of the steam trap.

8. A radiator steam trap comprising:
   (a) a hollow body with a horizontal side steam inlet, a vertical bottom condensate outlet, and a top cover;
   (b) an insert adapted to rest in and over the condensate outlet and having:
      (i) a lower cylindrical portion whose diameter is slightly less than the diameter of the condensate outlet so that the lower cylindrical portion fits snugly within the condensate outlet;
      (ii) a flange above the lower cylindrical portion whose diameter is greater than the diameter of the condensate outlet so that the insert is retained at the condensate outlet;
      (iii) an upper portion whose top is located at or above the steam inlet when the insert rests in and over the condensate outlet; and
      (iv) a restricted passageway for the flow of condensate from the steam inlet to the condensate outlet, the passageway comprising a plurality of horizontal radial inlets in the upper portion of the insert that communicate with a vertical conduit extending downward through the insert, the vertical conduit having an opening at the bottom, but not at the top, of the insert;

(c) a cylindrical screen for blocking the flow of particles into the restricted passageway of the insert, the screen having a diameter slightly greater than the diameter of the upper portion of the insert and having a height about equal to or slightly greater than the distance between the condensate outlet and the top cover so that substantially all the fluid entering the restricted passageway of the insert first passes through the screen; and (d) a compression coil spring having a diameter slightly greater than the diameter of the cylindrical screen and having a height slightly greater than the distance between the condensate outlet and the top cover so that, when the spring is placed into the trap and over the insert and screen, the spring is compressed and holds the insert and screen in position.

9. The radiator steam trap of claim 8 wherein the insert consists of a post and a sleeve, the post comprising the upper portion of the insert and the sleeve comprising the lower cylindrical portion and the projection of the insert.

10. The radiator steam trap of claim 9 wherein the restricted passageway in the post has a cross-sectional area greater than that of the sleeve.

11. The radiator steam trap of claim 10 wherein the post has a hexagonal horizontal cross-section.

12. The radiator steam trap of claim 11 wherein the horizontal side steam inlet has a center axis and a top and wherein the top of the post is located between the center axis and the top of the steam inlet.

13. The radiator steam trap of claim 12 wherein the restricted passageway in the sleeve has a diameter of about 0.3 to 3 mm.

14. The radiator steam trap of claim 13 additionally comprising a gasket adapted to fit between the flange and the body of the steam trap.

* * * * *